United States Patent Office 2,736,626
Patented Feb. 28, 1956

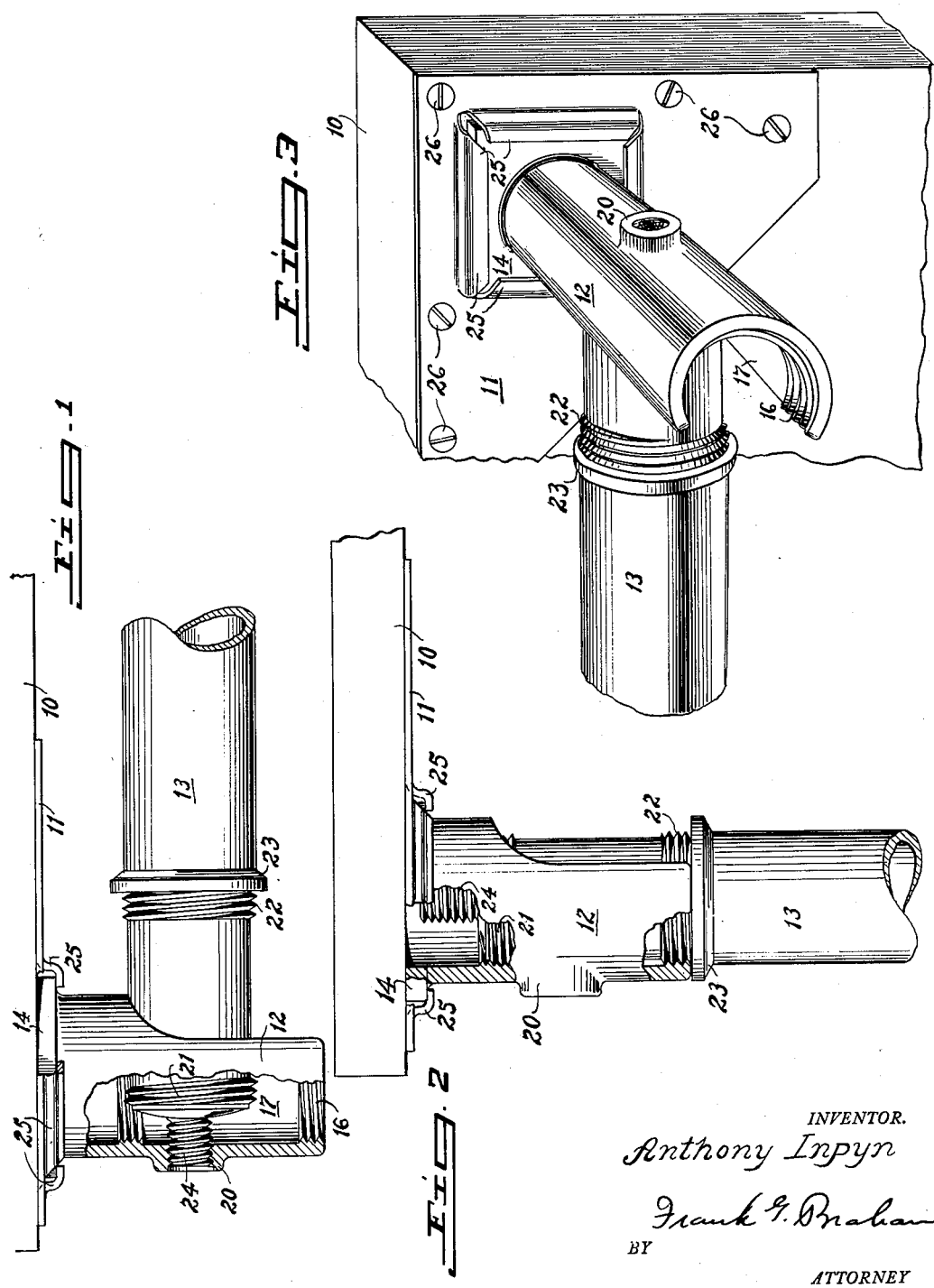

2,736,626

MEANS FOR SUPPORTING A FOLDING LEG TABLE SUPPORT IN FOLDED POSITION

Anthony Inpyn, Bronx, N. Y.

Application August 20, 1954, Serial No. 451,162

2 Claims. (Cl. 311—99)

This invention relates to improvements in supporting members such as those of the folding type used for tables, work benches and similar articles. More particularly, it relates to improved means for holding such members in folded position and is suitable for use in conjunction with my earlier invention disclosed in Patent No. 2,606,802.

The supported object to which my earlier invention is applied may often times be of substantial construction and consequently of comparatively great weight. Thus, the leg portions of the structure would also be sturdily formed, with the result that the clip means heretofore used for retaining the foldable legs in horizontal position parallel to the undersurface of the supported object had to grip the legs with considerable force thereby making it difficult to manually free the legs from the folded position.

It is therefore the object of the present invention to provide a simplified means for retaining a member in folded position while at the same time permitting the easy transformation from such position to a vertical object supporting position.

In carrying out the invention the supporting member is provided with a threaded stud on the top thereof and the socket piece in which the member is fitted is provided with an internally threaded portion situated so that when the threaded stud is inserted therein the supporting member is held parallel to the undersurface of the object normally supported thereby.

Features and advantages of the invention will be gained by the foregoing and the description which follows.

In the drawings:

Figure 1 is an elevational view, partly in section, showing the supporting means in folded position with respect to the object supported thereby;

Figure 2 is an elevational view, partly in section, showing the supporting means in extended position; and Figure 3 is a view in perspective showing the supporting means in folded position and particularly showing the means for securing the socket to the object to be supported.

Referring to the drawings, which show a preferred arrangement of the invention, the supported object 10 is illustrated as a table top and the supporting means is shown comprising three elements, namely, a securing member 11, a socket 12, and a leg 13, which will be separately described. The socket 12 and the leg 13 are shown formed of tubular pieces and they may conveniently be iron pipe stock although other material or forms may be resorted to. In fact, the socket and that portion of the leg which cooperates therewith may be formed by die casting.

Socket 12 is fashioned with a narrow square-shaped flange 14 which facilitates fastening of the member to the table 10 as will hereafter be described. The internal surface of the socket is provided with two spaced apart threaded sections, the upper section 15 being located somewhat below the flanged end of the socket and the lower threaded section 16 being formed at the bottom of the socket. As can be seen, each section is made up of only a few threads and these can be formed in any convenient manner. The non-threaded portion 17 of the socket between the threaded sections will be of a diameter at least equal to, but preferably slightly greater than, the root diameter of the internal threads.

A comparatively wide slot is provided to one side of the socket wall and it extends from the bottom of the socket, through the lower threaded section 16, the non-threaded portion 17 to the upper threaded section 15. It may extend through a thread or two of the section 15 but this is of no consequence. Disposed diagonally opposite to the slot is a boss 20 having a threaded central opening. As is apparent from the drawings, the boss is located nearer to the threaded section 15 than to the lower thread section.

The cooperating portion of leg 13 is shown formed with an upper threaded section 21 and a lower threaded section 22 separated therefrom by a smooth cylindrical surface. Just below the thread section 22 is an annular collar 23 which will be seen to control the degree of movement of the leg into the socket when the parts are arranged in an object supporting position. Above the thread section 21, the leg is enclosed in the case of the tubular member shown, and upstanding therefrom is the threaded stud 24. The diameter of the stud is less than that of the threaded sections 21 and 22.

Securing member 11 comprises a flat plate having an opening therein corresponding in shape to flange 14 of the socket. Each side of the opening is provided with a retaining lip 25 in spaced parallel relationship to the main surface of the plate. The spacing is such that when the plate is secured to the object 10 as by screws 26, the lips 25 rigidly hold socket flange 14 against the object thus providing a firm support for the socket. A securing member separate from the flange of the socket is preferred in that it simplifies manufacture of the components and also permits free selection of the direction in which the leg is folded. Note that in Figure 3 although the leg is illustrated as folded to the left, it may just as conveniently have been folded downwardly by rotating the socket one quarter turn counter-clockwise before tightening up on screws 26. This latter feature is of particular interest when it is considered that it may be desirable to have the legs of a supported object fold towards each other rather than around the circumference of the object as is generally the case with folding leg supported objects, e. g., card tables. In the instant case the same components are adaptable to all situations and consequently different parts with differently arranged flanges are not required.

In assembling the components, the socket is fastened to the object by the securing member 11. Thereafter, leg 13 is inserted by turning the upper thread portion 21 thereof through threaded section 16 of the socket. When this is accomplished the leg may be arranged in either an upstanding supporting position or in folded position. If it is desired to arrange the leg in an object supporting position, it is held aligned with the socket and raised until threaded portion 21 engages the threaded section 15 and threaded portion 22 engages section 16. Of course, threaded portion 21 can move freely past the non-threaded surface 17. Rotation of leg 13 to engage the cooperating threaded sections is continued until annular collar 23 abuts the lower end of the socket at which time a firm, rigid connection is formed between the leg and the object supported thereby.

To move the leg to folded position, the leg is rotated in the opposite direction until the threaded sections are out of engagement and the leg threaded portion 21 is located between thread sections 15 and 16. At this time the leg can be swung counter-clockwise (from the position illustrated in Figure 2 to that shown in Figure 1) so that the smooth cylindrical surface separating the thread portion of the leg moves between the lips of the slot formed in the socket. The lips of the slot are separated by a distance only slightly greater than the diameter of the cylindrical surface, and hence less than that of the threaded portion 21, thereby preventing removal of the leg through the slot. With the leg in horizontal folded position, the stud 24 is moved into alignment with the internally threaded boss and turned therein to thus lock the leg securely in folded position. To move the leg to an upstanding position, stud 24 is unscrewed from the boss and the leg is pivoted to a vertical position where it can again be securely held as above described.

It is to be understood that the invention is not limited to any specific form or embodiment except insofar as such limitations are specified in the appended claims.

What is claimed is:

1. Foldable means for supporting tables or like objects comprising a tubular socket affixed to the supported object having two sets of internal threads separated by a non-threaded section, a boss formed on and projecting outwardly from one side of said socket and provided with an opening to the internal non-threaded surface of said socket, said opening being threaded, a slot disposed oppositely of said boss and extending downwardly to the bottom of the socket, and a leg member having two spaced apart sets of extrenal threads formed at the upper end thereof for engagement with the internal threads of the socket when said leg member is in object supporting position, the diameter of the upper threaded portion of the leg member being greater than the width of the slot in the tubular socket, and a threaded stud atop said leg member for engagement with the internally threaded boss when said leg member is in folded position, said threaded stud being of lesser diameter than the upper threaded portion of said leg member and the overall length of said stud and the upper threaded portion of the leg member is less than the diameter of the non-threaded section of the tubular socket.

2. Foldable means for supporting tables or like objects according to claim 1 including fastening means comprising a narrow flange formed on the upper end of the tubular socket and a securing member provided with a square opening in which the flange of the socket fits and lips overlaying the opening to hold the socket in place when the securing member is attached to the supported object.

References Cited in the file of this patent

UNITED STATES PATENTS

| | | |
|---|---|---|
| 892,839 | Innes | July 7, 1908 |
| 918,665 | Gingrich | Apr. 20, 1909 |
| 1,260,734 | Vawter | Mar. 26, 1918 |
| 1,342,951 | Gagne | June 8, 1920 |
| 1,762,776 | Gardner | June 10, 1930 |
| 2,074,981 | Converse | Mar. 23, 1937 |
| 2,606,802 | Inpyn | Aug. 12, 1952 |